March 22, 1927.

E. C. HELLWIG 1,622,112

SYSTEM OF MOTOR CONTROL

Filed Sept. 20, 1926

Inventor

Emil C. Hellwig.

By

Attorney

Patented Mar. 22, 1927.

1,622,112

UNITED STATES PATENT OFFICE.

EMIL C. HELLWIG, OF DENVER, COLORADO.

SYSTEM OF MOTOR CONTROL.

Application filed September 20, 1926. Serial No. 136,525.

This invention relates to improvements in systems of thermostatic control.

It is often necessary to stop and start machinery in accordance with the state of some variable condition such as temperature pressure or water level and it is nearly always desirable that this control shall be effected by automatic means.

An example of machinery that is controlled in its operation by temperature conditions can be found in refrigeration, especially in connection with the smaller units that are now so extensively employed in domestic size refrigerators.

As an example of a device that is controlled by the state of pressure, attention is called to devices for supplying compressed air, especially such as are used for automobile tire inflation.

Where water is pumped into reservoirs or tanks, the level should be kept between two predetermined limits and my system is also adapted for such uses.

In each of the cases referred to above, there are an upper and a lower limit. When the upper limit is attained the machinery should be brought to a stop and when the lower limit is reached, the machinery should be put into operation. These limits may be as close to or as far removed from each other as may be found desirable.

I am aware that it is old to start and stop a motor by means of a thermostatically controlled switch and that air and water pumps have been stopped and started by pressure and level controlled switches, but, so far as I am aware, no one has heretofore accomplished this result by the means which I will now describe in detail.

In the accompanying drawing to which reference will now be had, I have illustrated my invention diagrammatically.

Figure 1:
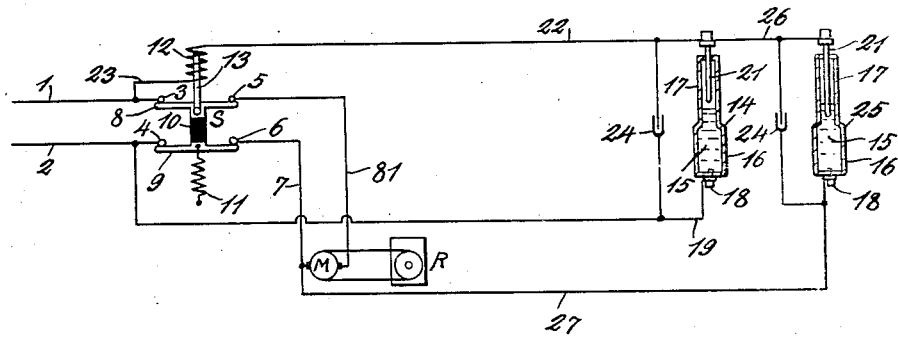
Fig. 1 is a diagrammatic circuit connection showing my invention in its simplest form.

In the drawing numerals 1 and 2 represent the electrical conductors that lead from the source of electrical supply and 3 and 4 represents the live contacts of the switch whose other contacts are designated by numerals 5 and 6. The motor to be controlled has been designated by the letter M and is connected to the contacts 5 and 6 by means of conductors 7 and 81. The switch S has been shown diagrammatically, and numerals 8 and 9 represent two switch blades which are connected by an insulating member 10. These switch blades are adapted to make electrical connections between contacts 3, 5 and 4, 6. A spring 11 tends to move the switch to circuit opening position. For the purpose of closing the switch, I have provided an electromagnet comprising a solenoid 12 and a core 13. The core has one end connected with the switch bar 8. It is, of course, understood that the core 13 is properly insulated from the live parts of the switch. A thermostatic circuit closer 14 is located at the point where the temperature variations take place. This circuit closer has been illustrated as having a mercury electrode 15, which is confined within a casing of insulating material. This casing has a container portion 16 and a long narrow neck 17. A binding screw 18 is secured to the bottom of the container portion and serves to connect the mercury 15 with the conductor 19 by means of which the mercury electrode is put into electrical connection with the feed wire 2. A cap 20 is secured to the upper end of the neck 17 and this carries an adjustable electrode 21 whose lower end is in contact with the mercury 15 at temperatures above a predetermined value. A wire 22 connects the electrode 21 with one end of the solenoid 12 whose other end is connected with the wire 1 by means of a conductor 23. It is now evident that when the mercury 15 in the circuit closer 14 comes into contact with the electrode 21, current will flow from wire 1 through the solenoid and circuit closer and to wire 2 through conductor 19. This will energize the coil 12 and close the switch whereby connection is made to the motor M which is then put into operation. With the parts just described, the motor will start as soon as the thermostat 14 closes and stop as soon as it opens, which would be unsatisfactory as it would provide for a variation of a few degrees only. A condenser 24 has been shown in parallel with the electrodes 15 and 21 for the purpose of reducing the spark when the circuit is opened. This condenser is not necessary and may be omitted. I want to call attention at this point to the obvious fact that any suitable temperature controlled circuit closer may be used instead of the mercury circuit, as, for example, a circuit closer using a bimetallic element.

In order to maintain the motor in operation after the circuit closer 14 has opened, I have provided a second closer which I have designated by numeral 25 which may be identical in construction with circuit closer 14. The electrodes 21 of the closers are connected in parallel by means of a conductor 26 (Fig. 1) but the binding post 18 of closer 25 is connected to wire 7 by means of a conductor 27. The mercury in the closure 25 overlaps the electrode 21 to a greater extent than in closer 14 so that the circuit will open at a lower temperature than closure 14, so as to provide as large a temperature range between the opening of the two circuit closures or relays as may be desired. In the absence of the relay 25, it has been shown that the switch S will open the instant that the current is broken through the relay 14, but with relay 25 in the circuit, the current through solenoid 12 has two parallel paths as long as the switch S closed and therefore the solenoid will remain energized as long as the current can flow through the relay 25. When the the temperature falls until the mercury becomes separated from the electrode 21, the solenoid 12 will be deenergized whereupon the spring 11 will cause the switch S to open. When the temperature increases relay 25 will close first, but as wire 7 is dead when the switch S is open, the solenoid will not be energized until relay 14 closes. After the switch S is closed, it remains closed until relay 25 opens, as above explained. In case the motor M operates a refrigeration machine the relays or thermostatic circuit closers will be located in the refrigerator whose temperature will vary only between the maximum and minimum temperature as determined by the setting of the relays.

Figure 2:
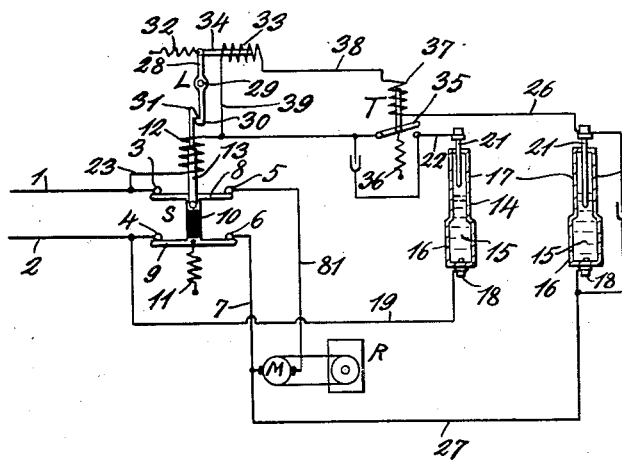
Fig. 2 is a schematic representation of a slightly modified form of my invention.
Figure 3:
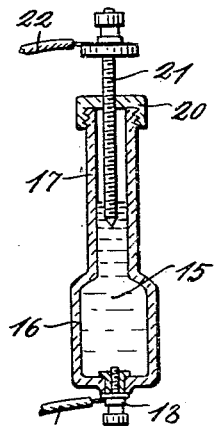
Fig. 3 is a longitudinal section through one of the thermostatic elements.

In the construction just described and shown in Fig. 1, switch S is held closed by the solenoid 12 and as this requires considerable current there may be an appreciable loss when a large main switch is employed, and in Fig. 2 I have therefore illustrated a modified arrangement in which the current through the solenoid may be reduced to a negligible quantity during the time that switch S is closed.

From Fig. 2, it will be observed that I have provided a latch L for locking the switch S in closed position. The latch member 28 is pivoted at 29 and has its lower end provided with a hook 30 which engages a cooperating hook on the upper end of the core 13. A spring 32 exerts a force tending to open the latch which is only maintained in operative position when the solenoid 33 is energized. This solenoid acts on a core 34. I have also provided an electromagnetic switch T in the conductor 22. This switch comprises a movable switch member 35 which is normally maintained in circuit closing position by means of a spring 36 and which is opened whenever the solenoid 37 is energized. The conductor 26 instead of extending to the electrode 21 on relay 14 is connected to one terminal of the solenoid 37 which is connected in series with solenoids 33 and 12, by means of conductors 38 and 39. Solenoids 33 and 37 are made of such high resistance that the current which can flow through them is very small.

When switch S is open, switch T will be closed because the conductor 7 is not connected with the current source. As soon as the temperature rises sufficiently to close the relay 14, a circuit is completed through solenoid 12 whereupon switch S closes. As soon as switch S has closed, current will flow through conductors 7 and 27 to relay 25 and from thence through conductor 26, solenoid 37, conductor 38, solenoid 33, conductor 39, solenoid 12 and conductor 23 to live wire 1. When solenoid 33 is energized, the latch member 28 will immediately be moved into operative position and at the same time solenoid 37 will open switch T. Owing to the high resistance of solenoids 33 and 37, only a very small currrent will flow through them which means a considerable saving in large installations. When the temperature has fallen until the circuit is opened by the relay 25, solenoids 33 and 37 will become deenergized. This permits the spring 32 to move the latch member to unlocking position and the switch member 35 to closed position. The switch S will now open and the motor remains stationary until the circuit is closed by the relay 14.

Figure 4:
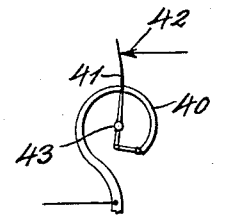
Fig. 4 is a view showing a pressure controlled circuit closer which may be substituted for the thermostatic circuit closers when the invention is to be controlled by pressure.

In Fig. 4 I have shown a pressure controlled relay or switch in which the interior of the Bourdon tube 40 is subjected to pressure which tends to straighten it. The change of curvature rotates the pointer 41 about its pivot 42 and moves it towards and away from the contact 42. By making the end of the pointer resilient considerable movement can take place without breaking the electrical connection between it and the stationary contact 42.

The refrigeration machine to which the motor M is connected has been designated by letter R and this may also be considered as representing a pump.

From the above it will be apparent that I have produced a motor control circuit that is especially well adapted to be used in connection with refrigerating machines and which allows as large a temperature range between the starting and stopping as may be desired.

Having described my invention what I claim as new is:

1. In an automatic motor control system having a source of electric current, a motor and a normally open electromagnetic switch for controlling the current to the motor, the combination with said switch and electric current source of a circuit closer that will close an electric circuit through a magnetic coil of the switch and cause the same to close when certain controlling conditions reach a predetermined limit in one direction, means comprising a second circuit closer for producing a parallel path for the switch operating current after the switch has been closed, said second circuit closer being arranged to open after the first mentioned circuit closer has opened whereby the electromagnetic switch will remain closed through a predetermined range in the controlling conditions.

2. In an electrical system of the class in which a motor is employed to operate a mechanism by means of which changes in temperature may be effected and when the temperature has been reduced to a predetermined value, a thermo responsive device is caused to operate to stop the motor, the combination with said motor and a source of electric current supply of a normally open electromagnetic switch, a thermo responsive switching device for controlling the current which closes the electromagnetic switch, a second thermo responsive switching mechanism for opening said electromagnetic switch when the temperature is reduced below a predetermined value and means associated with the second thermo responsive switching mechanism for maintaining the electromagnetic switch closed, regardless of whether the first thermal switch is closed or open until said second thermo responsive switching mechanism opens.

In testimony whereof I affix my signature.

EMIL C. HELLWIG.